(12) United States Patent
Hong et al.

(10) Patent No.: US 11,609,582 B2
(45) Date of Patent: Mar. 21, 2023

(54) SYSTEMS AND METHODS FOR PLANNING A TRAVEL ROUTE OF A MULTIFUNCTIONAL ROBOT

(71) Applicant: Ford Global Technologies, LLC, Dearborn, MI (US)

(72) Inventors: Sanghyun Hong, Ann Arbor, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 17/066,224

(22) Filed: Oct. 8, 2020

(65) Prior Publication Data

US 2022/0113744 A1    Apr. 14, 2022

(51) Int. Cl.
*G05D 1/00* (2006.01)
*G08G 5/00* (2006.01)
(Continued)

(52) U.S. Cl.
CPC .......... *G05D 1/106* (2019.05); *B64C 39/024* (2013.01); *G06T 7/60* (2013.01); *G08G 5/0039* (2013.01);
(Continued)

(58) Field of Classification Search
CPC ...... G05D 1/106; G05D 1/101; G05D 1/0217; G05D 1/0242; G05D 1/0214; G05D 1/0221; G05D 1/0251; G05D 1/0257; G05D 1/0263; G05D 1/0276; G05D 2201/0208; G05D 1/00; B64C 39/024;
(Continued)

(56) References Cited

U.S. PATENT DOCUMENTS 9,262,929 B1 * 2/2016 Roy ..................... G08G 5/0034
10,234,303 B1 * 3/2019 Chandrashekarappa ...................
    G01C 23/00
(Continued)

FOREIGN PATENT DOCUMENTS

EP        3433691 B1 *  4/2021  ............ B60W 30/00

OTHER PUBLICATIONS

Flying Star, a Hybrid Crawling and Flying Sprawl Tuned Robot (Year: 2019).*
(Continued)

*Primary Examiner* — Yonel Beaulieu
(74) *Attorney, Agent, or Firm* — Brandon Hicks; Eversheds Sutherland (US) LLP (57) ABSTRACT

The disclosure generally pertains to travel planning for a multifunction robot that can travel on a ground surface and can fly over obstacles. In an example embodiment, a controller of the multifunction robot receives an Occupancy Grid map that provides information about a travel area to be traversed by the multifunctional robot. The controller may determine a first cost associated with a first travel route that involves the multifunctional robot driving around a 3D object when moving along the ground from an origination spot to a destination spot in the travel area. The controller may further determine a second cost associated with a second travel route that involves the multifunctional robot flying over the 3D object when moving from the origination spot to the destination spot. The controller may select either the first travel route or the second travel route based on comparing the first cost to the second cost.

18 Claims, 9 Drawing Sheets

(51) Int. Cl.
*B64C 39/02* (2006.01)
*G05D 1/10* (2006.01)
*G08G 5/04* (2006.01)
*G06T 7/60* (2017.01)

(52) U.S. Cl.
CPC ........... *G08G 5/0069* (2013.01); *G08G 5/045* (2013.01); *B64C 2201/027* (2013.01); *B64C 2201/042* (2013.01); *B64C 2201/127* (2013.01); *B64C 2201/146* (2013.01); *G06T 2207/10032* (2013.01)

(58) Field of Classification Search
CPC ........ B64C 2201/027; B64C 2201/042; B64C 2201/127; B64C 2201/146; B64C 2201/123; B64C 39/02; G06T 7/60; G06T 2207/10032; G08G 5/0039; G08G 5/0069; G08G 5/045; G08G 5/00; G01C 21/00
See application file for complete search history.

(56) References Cited

U.S. PATENT DOCUMENTS

| | | |
|---|---|---|
| 2006/0025888 A1 | 2/2006 | Gutmann et al. |
| 2007/0001831 A1* | 1/2007 | Raz ..................... G07C 5/0816 340/439 |
| 2008/0303696 A1* | 12/2008 | Aso ........................ G08G 1/161 340/933 |
| 2010/0299013 A1* | 11/2010 | Dolgov ................ G05D 1/0274 701/25 |
| 2016/0070265 A1 | 3/2016 | Liu et al. |
| 2016/0272314 A1* | 9/2016 | Radu ........................ B60F 5/02 |
| 2020/0218913 A1* | 7/2020 | Unnikrishnan ......... B60R 11/04 |
| 2021/0104164 A1* | 4/2021 | Erignac ................ G05D 1/0223 |
| 2022/0003581 A1* | 1/2022 | Fox ...................... G01D 18/004 |

OTHER PUBLICATIONS

Gregorio et al., "SkiMap: An Efficient Mapping Framework for Robot Navigation", DISI, University of Bologna, Italy, Apr. 19, 2017, 8 pages.

Gu et al., "Path planning for a mobile robot in a 2.5 dimensional grid-based map", International Journal of Robotics Research & Application, vol. 38, Issue 3, Emerald Insight, Mar. 24, 2016, pp. 315-321.

* cited by examiner

SYSTEMS AND METHODS FOR PLANNING A TRAVEL ROUTE OF A MULTIFUNCTIONAL ROBOT

BACKGROUND

Robots are used for various purposes. The physical structure and capabilities of each of these robots is generally tailored to match a purpose for which the robot is deployed. In some cases, a robot is fixed in place, such as, for example, an assembly robot on a factory floor. In other cases, a robot may be a mobile robot that moves from one place to another. Mobile robots may be broadly classified into two categories—terrestrial robots and aerial robots. Terrestrial robots are typically equipped with wheels or tracks that allow these robots to traverse various kinds of travel surfaces, such as roads, pavements, dirt areas, and lawns. Various sensing systems, such as cameras, sonar systems, radar systems etc., that are mounted on terrestrial robots allow the robots to circumnavigate obstacles while moving on the ground along a travel route to a destination spot, such as, for example, a stoop of a house. The travel route in this example may include a sidewalk, a doorway, a lawn, and a walkway.

In one case, a terrestrial robot may travel to the destination spot by using a trial-and-error method to circumnavigate obstacles. In another case, a robot may travel to the destination spot by following a pre-programmed travel route. However, designing a pre-programmed travel route may be complicated and/or difficult in some environments where certain types of obstacles exist in a travel route of the terrestrial robot. Some of these obstacles, such as, for example, a wall enclosing a property or a closed gate, may be insurmountable by the terrestrial robot.

Aerial robots, which are also known as drones or unmanned aerial vehicles (UAVs), provide one solution for overcoming these types of obstacles, because a UAV can fly over them. Here again, an aerial robot may follow a pre-programmed aerial travel route. However, in some cases, it may be cost-ineffective and/or infeasible to deploy an aerial robot, particularly when the travel route includes a significant portion that can be traversed more cost-effectively by a terrestrial robot.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein generally pertain to travel route planning for a multifunction robot that can travel on a ground surface and can fly over obstacles as well. In an example embodiment, a controller of the multifunction robot receives a map, such as, for example, an Occupancy Grid map (OG map). The map provides information about a travel area to be traversed by the multifunctional robot. The travel area may include some portions that are ground areas over which the multifunctional robot can move and may also include one or more objects that constitute obstacles in a travel path of the multifunctional robot. The controller may determine a first cost associated with using a first travel route that involves the multifunctional robot driving around a 3D object when moving along the ground from an origination spot to a destination spot in the travel area. The controller may determine a second cost associated with using a second travel route that involves the multifunctional robot flying over the 3D object when moving from the origination spot to the destination spot. The controller may then select either the first travel route or the second travel route based on comparing the first cost to the second cost. In another embodiment, the controller may evaluate one or more images of the 3D object to determine if the multifunctional robot can climb over the 3D object. A cost associated with doing so may be calculated by the controller and compared against other costs, such as the first cost and the second cost, in order to determine a travel route for the multifunctional robot.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. Furthermore, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "travel route" as used herein may be interpreted in at least some cases as representing a "travel path." As another example, words, such as "generate" and "generating," that are used in this disclosure may include various actions that may be described by words, such as "plan" and "planning." More particularly, the phrase "multifunctional robot" as used herein may be generally described as a robot that combines various features of a terrestrial robot with various features of an aerial robot (a drone, a UAV etc.).

Figure 1:
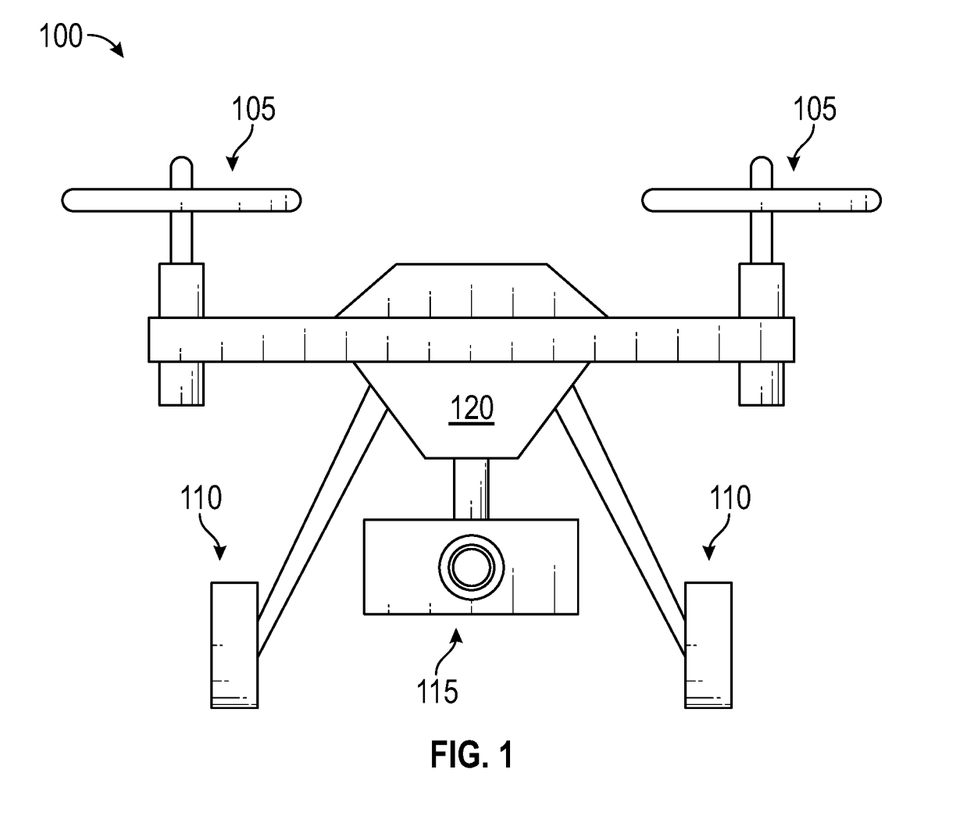
FIG. 1 shows an example multifunctional robot that may be configured to move along a travel route determined in accordance with the disclosure.

FIG. 1 shows an example multifunctional robot 100 that may be configured to move in accordance with a travel route that is determined in accordance with the disclosure. In the illustrated example, the multifunctional robot 100 includes a set of wheels 110 that allows the multifunctional robot 100 to move on the ground and further includes a set of propellers 105 (and/or wings) that allows the multifunctional robot 100 to be airborne. In various other embodiments, the multifunctional robot 100 may include components, such as tracks, claws, tentacles, grippers etc., that allow the multifunctional robot 100 to travel over various types of ground surfaces (roads, pavements, dirt areas, lawns, etc.) and traverse objects, such as, for example, a ramp, a staircase, and/or an escalator. In some applications, the multifunctional robot 100 may utilize some of these components to climb over objects, such as, for example, a low wall, a raised platform, and/or an edge of a sidewalk.

The multifunctional robot 100 may further include various types of equipment based on the type of application for which the multifunctional robot 100 is used. In one example application, the multifunctional robot 100 may be outfitted as a delivery robot. In another example application, the multifunctional robot 100 may be outfitted for search and rescue missions. In yet another example application, the multifunctional robot 100 may be outfitted for military purposes.

The multifunctional robot 100 may typically include various types of systems, such as, for example, a navigation system, an imaging system, and a robot controller 120. The navigation system may include items, such as, for example, a radar device, a sonar device, a light detection and ranging (LIDAR) device. The imaging system may include items, such as a digital camera and/or a video camera. An example camera 115 is shown mounted on the multifunction robot 100 illustrated in FIG. 1.

The robot controller 120 that is provided in the multifunctional robot 100 can include various hardware and software components that control various operations of the multifunctional robot 100. Some of these operations can include, for example, obtaining a map of a travel area, planning a travel route through the travel area, and executing the travel route by operating the appropriate propulsion components, such as the set of wheels 110 and/or the set of propellers 105.

Figure 2:
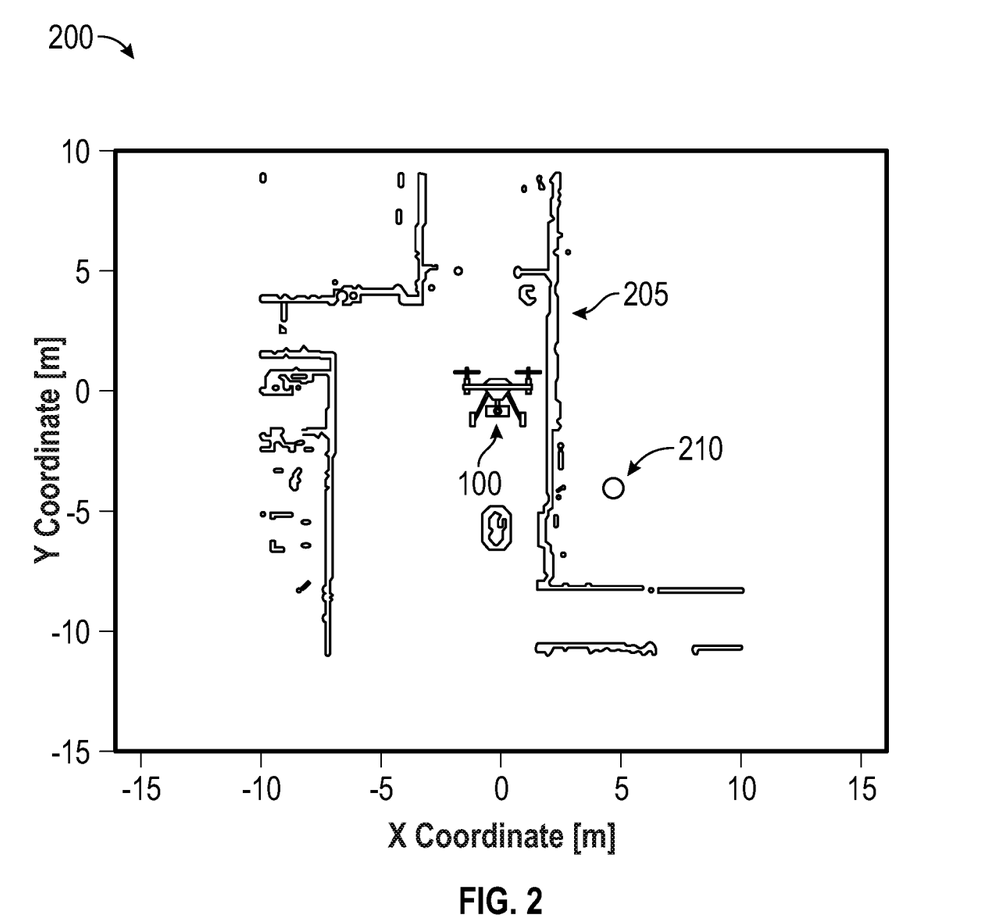
FIG. 2 shows an example two-dimensional (2D) Occupancy Grid map (OG) that may be used by a controller in a robot to generate a travel route in accordance with the disclosure.

FIG. 2 shows an example two-dimensional (2D) Occupancy Grid map (OG map) 200 that may be used by the robot controller 120 to plan and generate a travel route in accordance with the disclosure. In other embodiments, other types of maps may be used in place of the 2D OG map 200. The 2D OG map 200 is a graphical representation of objects present in a travel area of the multifunctional robot 100. Some example objects may include, for example, walls of a building and objects placed on the ground in the building, such as, for example, a piece of furniture or a partition wall. In another case, the 2D OG map 200 may indicate objects present outside a building, such as, for example, an ornament on a lawn, a mailbox, and/or a fountain in a front yard.

The various objects are depicted in a dark shade (such as a wall 205). Areas through which the multifunctional robot 100 can move on the ground are non-shaded (white). The robot controller 120 in the multifunctional robot 100 and/or another computing device to which the multifunctional robot 100 is communicatively coupled, can generate a travel route by evaluating the 2D OG map 200 to identify areas (white areas) where the multifunctional robot 100 can move on the ground and obstacles that the multifunctional robot 100 may circumnavigate to reach a destination spot. Height information of the various objects may not be included in the 2D OG map 200 because, in this example, the robot controller 120 generates a travel route that is entirely on the ground and does not require the use of the flying capabilities of the multifunctional robot 100. The robot controller 120 may make a determination not to use the flying capabilities of the multifunctional robot 100 based on various factors, such as, for example, due to the travel area being located inside a building where it is infeasible to fly the multifunctional robot 100 and/or due a battery limitation that restricts flight time of the multifunctional robot 100.

In this example implementation, the robot controller 120 may generate a travel route that is identified on the basis of X-Y coordinates (2D coordinates) of the 2D OG map 200. The (0,0) coordinates of the of the 2D OG map 200 may be referenced to any image frame that may be defined by the robot controller 120. Thus, for example, the robot controller 120 may generate a travel route having an origination spot at (0,0) where the multifunctional robot 100 is currently located and a destination spot 210 at (5, −5). In this case, the spot (0,0) may constitute a 2D coordinate of a frame that is defined by a reference position of the multifunctional robot 100 (a start position, for example). The 2D coordinates may be defined with various levels of resolution depending on various factors, such as, for example, a level of precision needed for the multifunctional robot 100 to circumnavigate objects and/or a level of precision for dropping-off a package at the destination spot. The robot controller 120 may generate the travel route based on any one or more route generation algorithms and one or more 2D OG maps.

Figure 3:
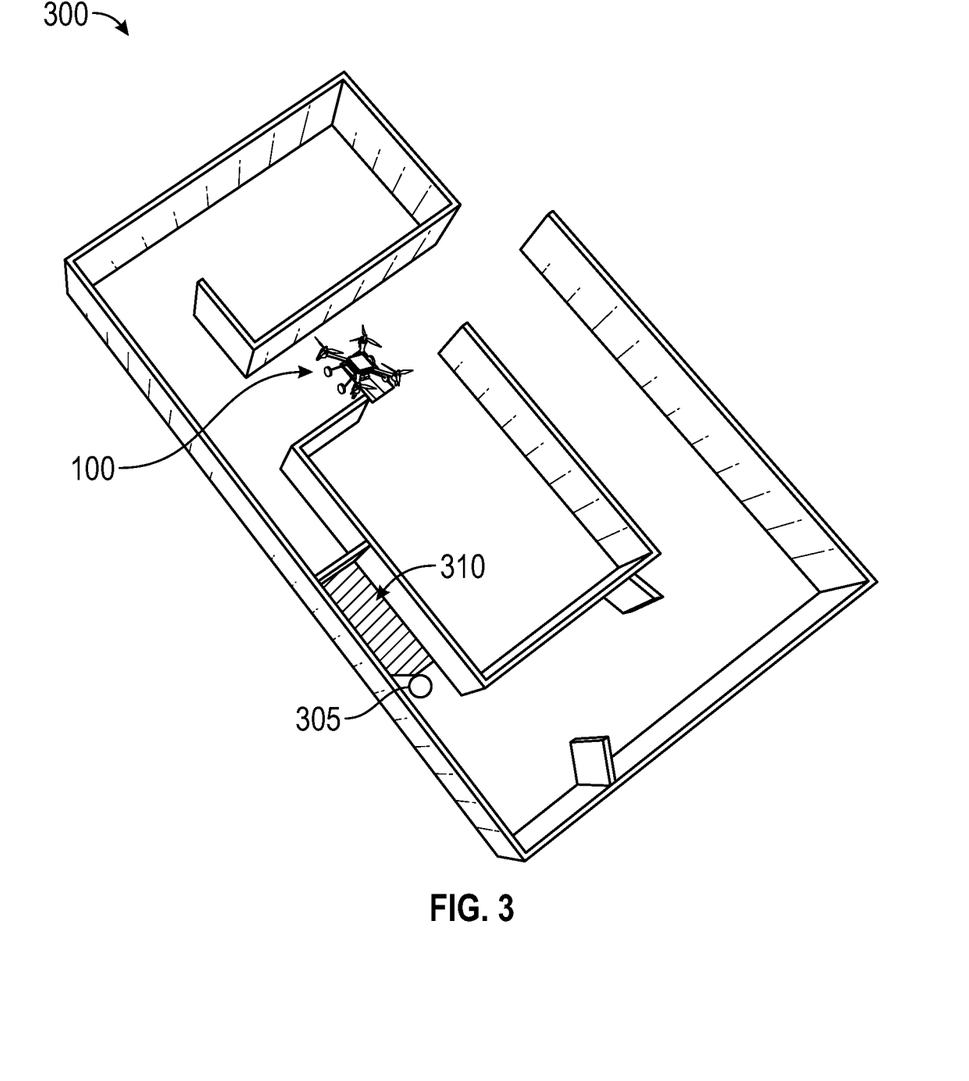
FIG. 3 shows an example representation of a three-dimensional (3D) scenario that includes a travel area for a multifunctional robot in accordance with the disclosure.

FIG. 3 shows an example representation of a three-dimensional (3D) scenario 300 that may constitute a travel area for a multifunctional robot 100 in accordance with the disclosure. The 3D scenario 300 in this example, is an interior area of a building. An obstacle 310 blocks a passageway inside the building and the multifunctional robot 100 can neither circumnavigate the obstacle 310 nor fly over the obstacle 310. Consequently, the robot controller 120 may evaluate the obstacle 310 to generate a travel route using a 2D OG map where the multifunctional robot 100 follows a travel route that avoids the passageway or by using a 3D OG map where the multifunctional robot 100 flies over the obstacle 310 (if feasible to do so).

Figure 4:
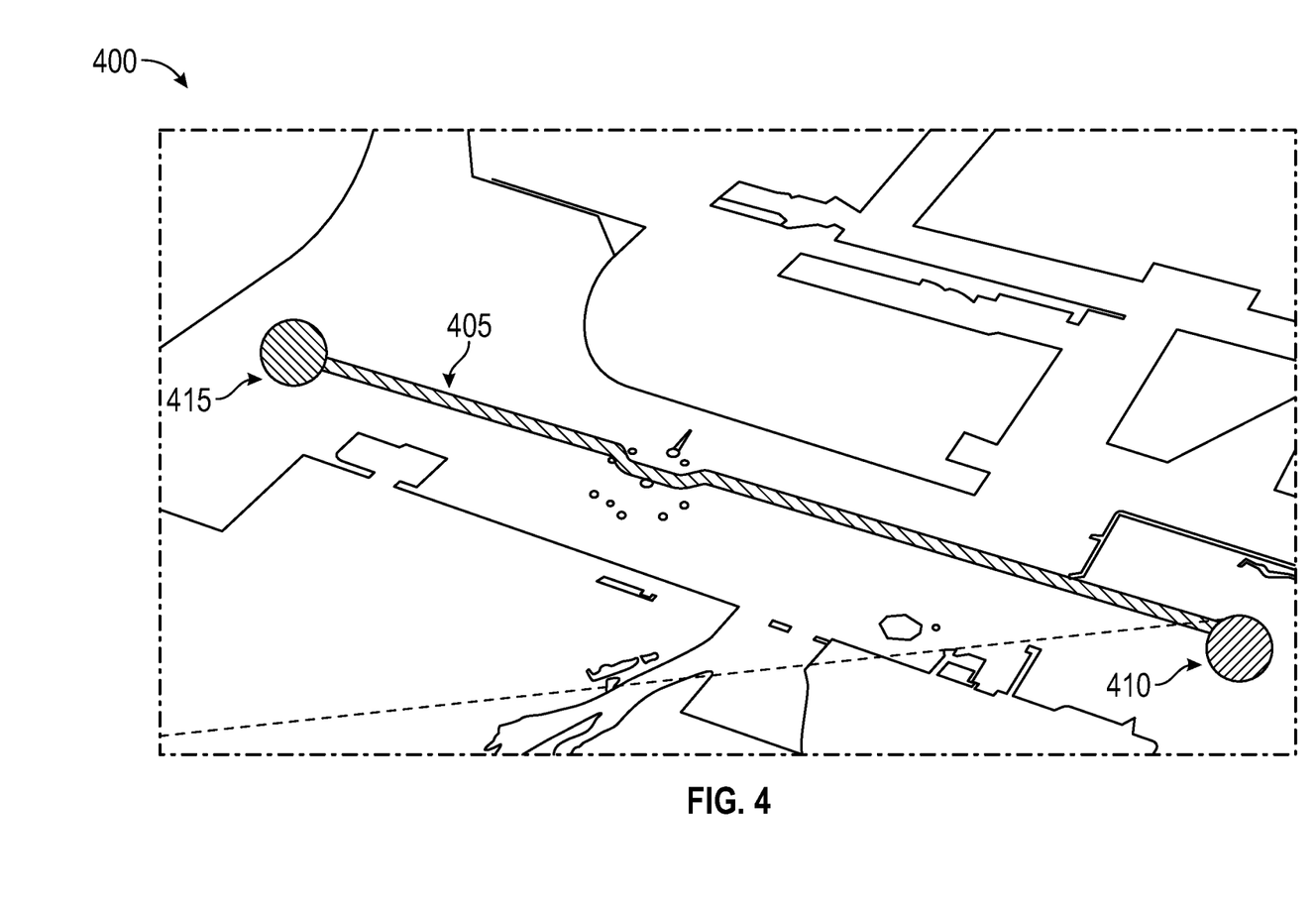
FIG. 4 illustrates an example 2D travel route that is generated on the basis of evaluating a 2D OG map in accordance with an embodiment of the disclosure.

FIG. 4 illustrates an example travel route 405 that may be planned and generated by the robot controller 120 on the basis of evaluating a 2D OG map 400, in accordance with an embodiment of the disclosure. Some obstacles are located between an origination point 410 and a destination point 415 in this example. The robot controller 120 of the multifunctional robot 100 may evaluate the obstacles on the 2D OG map 400 to plan and generate the travel route 405 in the form of a 2D travel route. In this example, the travel route 405 involves the multifunctional robot 100 circumnavigating around one or more of various obstacles. The robot controller 120 may plan the 2D travel route by opting not to take into consideration height parameters of the obstacles due to various reasons. For example, the robot controller 120 may opt not to take into consideration height parameters of the obstacles because it may be infeasible or impermissible to fly the multifunctional robot 100 in the travel area. The robot controller 120 may include a path follower system to enable the multifunctional robot 100 to follow the travel route 405.

Figure 5:
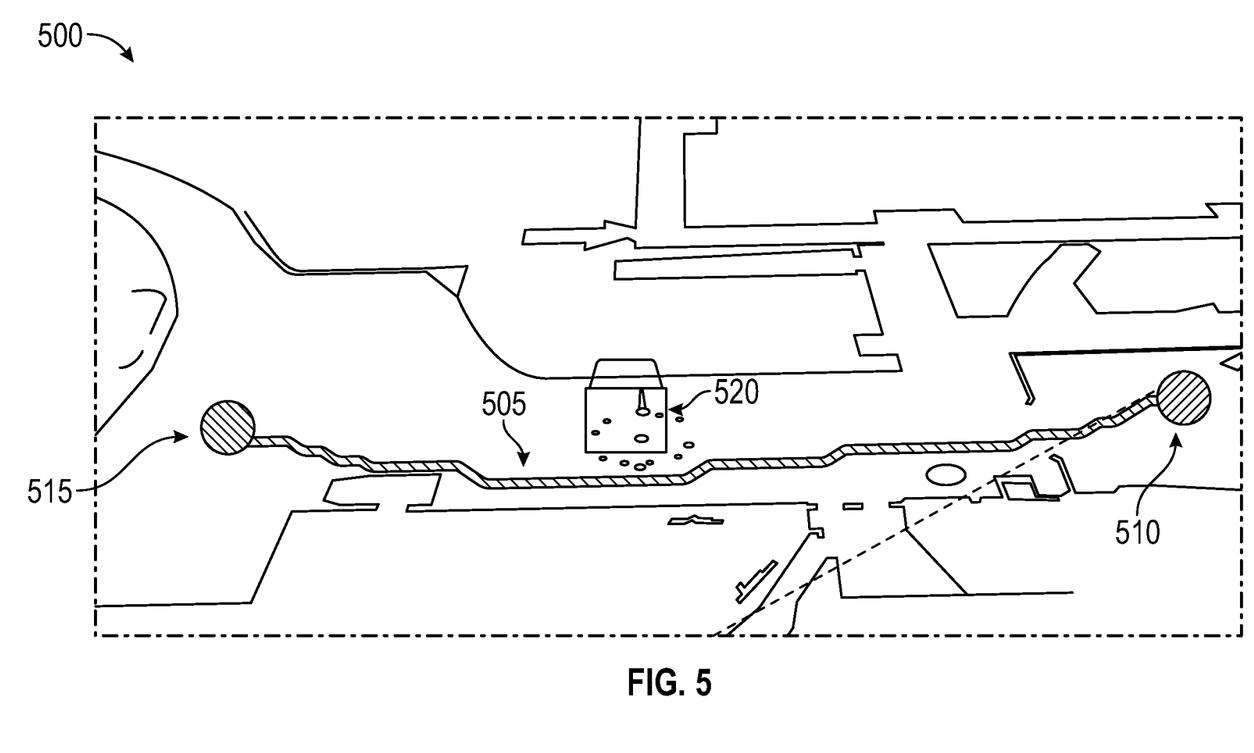
FIG. 5 illustrates an example 2.5D travel route that is generated on the basis of evaluating a two and a half dimensional (2.5D) OG map in accordance with an embodiment of the disclosure.

FIG. 5 illustrates an example travel route 505 that may be planned and generated by the robot controller 120 on the basis of evaluating a 2D OG map 500 in accordance with an embodiment of the disclosure. The travel area in this example is the same as described above with reference to FIG. 4 and includes an origination spot 510, a destination spot 515, and one or more obstacles 520. The 2D OG map 500 may not only provide 2D information of the travel area, but may further provide height information (in the form of x, y, z coordinates) about one or more objects in the travel area. Consequently, the map be also referred to as a 2.5D OG map. The robot controller 120 of the multifunctional robot 100 may evaluate the obstacles on the 2D OG map 500 and use the x, y, z coordinate information of an object to determine a height characteristic of the object that may constitute an obstacle in a travel route.

The robot controller 120 may then determine a cost factor for executing various types of travel routes. For example, in a first case, the robot controller 120 may determine a first cost associated with the multifunctional robot 100 traversing a first travel route that involves circumnavigating one or more of the obstacles. The first cost may be based on various factors, such as, for example, a travel distance as a result of circumnavigating one or more of the obstacles, a travel time due to circumnavigating one or more of the obstacles, and/or a height of one or more of the obstacles.

The robot controller 120 may determine a second cost associated with the multifunctional robot 100 traversing a second travel route that involves flying over one or more of the obstacles. The second cost may be based on various factors, such as, for example, a travel distance as a result of flying over the obstacle(s), a travel time due to flying one the obstacle(s), a flight constraint associated with flying in the travel area, a constraint associated with flying over an obstacle, height restrictions of overhead structures, such as a ceiling, and the presence of any items that may pose a hazard during flight.

The robot controller 120 may determine a third cost associated with the multifunctional robot 100 traversing a third travel route that involves climbing over one or more of the obstacles. The third cost may be based on various factors, such as, for example, a height of one or more of the obstacles, a shape of one or more of the obstacles, and other physical characteristics of one or more of the obstacles.

The robot controller 120 may then select one of the three travel routes based on comparing the three costs. The selected travel route may be executed by the robot controller 120 in the form of a 2.5D travel route plan.

In another example embodiment, the robot controller 120 may use the camera 115 to capture one or more images of one or more of the obstacles in order to plan the second travel route and/or the third travel route. The images may be evaluated in order to obtain information that complements information derived from one or more maps, such as the 2D OG map 500 or a 3D OG map. The images maybe evaluated in order to obtain information, such as the size of an object and/or the shape of the object (various heights in various portions of the object, various curvatures in various portions of the object, various sloping surfaces in various portions of the object, etc.). The information may be used by the robot controller 120 to determine whether the multifunctional robot 100 can climb over the object or whether it is preferable to fly over the object.

Figure 6:
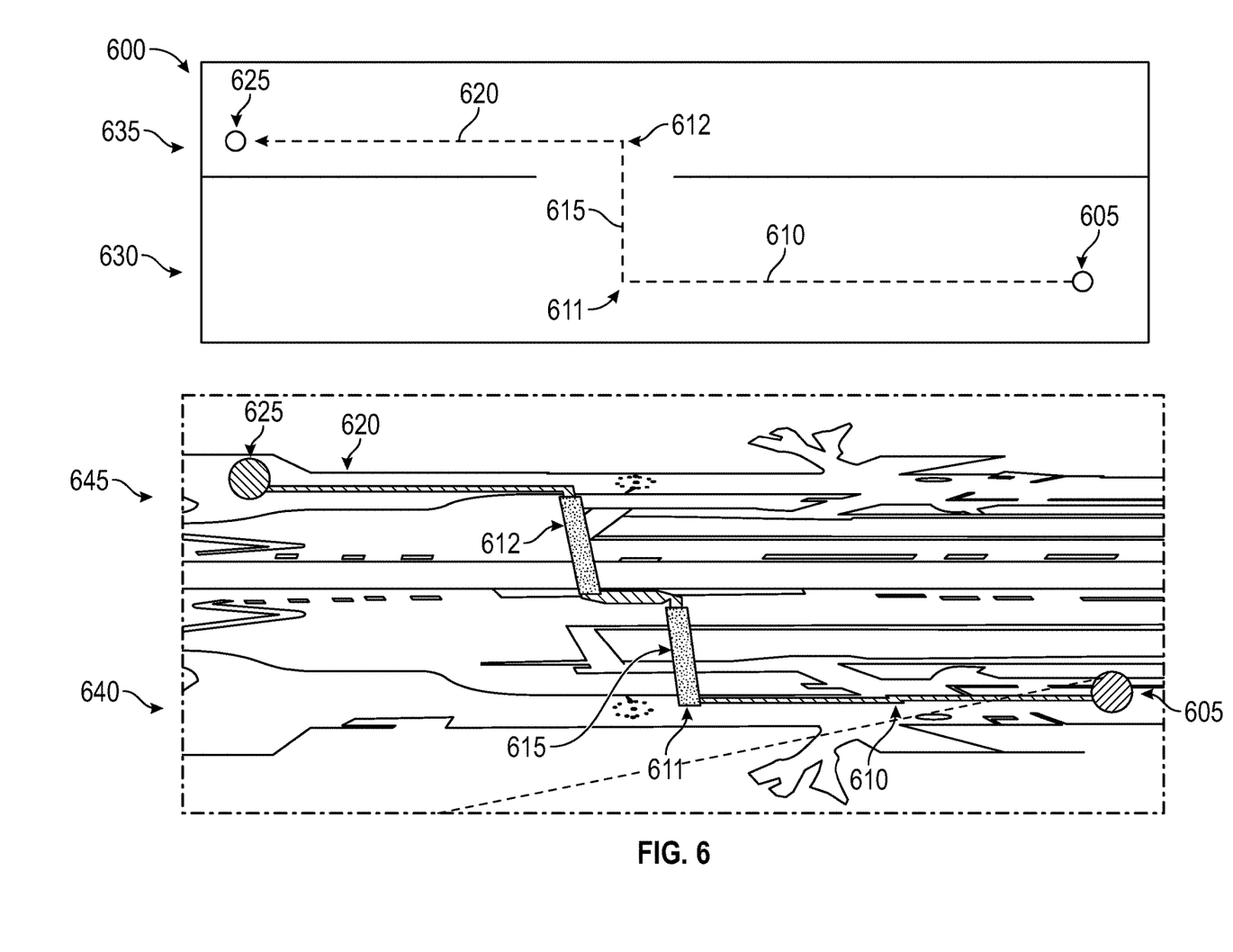
FIG. 6 illustrates an example 2D multilevel travel route that may be generated on the basis of evaluating multiple 2D OG maps in accordance with an embodiment of the disclosure.

FIG. 6 illustrates an example travel route that may be generated by the robot controller 120 on the basis of evaluating two or more 2D OG maps that are associated with a multi-level structure, in accordance with an embodiment of the disclosure. The travel area in this example includes a level 630 and a level 635 located above level 635 in a multistoried building 600. The description provided with reference to level 630 and level 635 is equally applicable to any two or more levels of the multistoried building 600. The travel route that is described in this example is from an origination spot 605 located on level 630 to a destination spot 625 located on level 635. In other cases, the travel route can originate from any spot located on level 635 and downwards to any spot located on level 630.

In this example, the robot controller 120 of the multifunctional robot 100 may obtain two 2D OG maps for planning a travel route on the two levels. The two 2D OG maps can include a 2G OG map 640 of level 630 and another 2D OG map 645 of level 635. The 2D OG map 640 of level 630 may be evaluated by the robot controller 120 to identify any obstacles if present in the level 630, and to identify a transition point 611 on the level 630. The transition point 611 represents any point on level 630 where the multifunctional robot 100 can move from level 630 to level 635 by traversing a travel route 615.

In one example application, the transition point 611 may be defined on the basis of various structures, such as, for example, a ramp, a stairway, an escalator, and/or an elevator, that is present in level 630. In another application, where feasible, the transition point 611 may be a spot from which the multifunctional robot 100 can fly from level 630 to level 635 (such as from an open balcony on level 630 to an open balcony on level 635).

The robot controller 120 may generate a travel route 610 based on one or more costs that may be derived by evaluating the 2D OG map 640 for identifying any obstacles that may be present on level 630 and for determining the transition point 611. The travel route 610 can be defined on the basis of X-Y coordinates (2D coordinates) and may involve the multifunctional robot 100 circumnavigating, flying, or climbing over one or more obstacles on level 630 in the manner described above.

The robot controller 120 may evaluate the 2D OG map 645 to identify any obstacles that may be present on level 635 (between a transition point 612 and a destination spot 625) and generate a travel route 620 based on one or more costs. The travel route 620 can be defined on the basis of X-Y coordinates (2D coordinates) and may involve the multifunctional robot 100 circumnavigating, flying, or climbing over one or more obstacles on level 635 in the manner described above.

A travel route plan generated by the robot controller 120 in this example may be referred to as a 2D multi-level travel route plan that includes a first 2D travel route plan and a second 2D travel route plan. The first 2D travel route plan may be used to execute the travel route 610 and the second 2D travel route plan may be used to execute the travel route 620.

Figure 7:
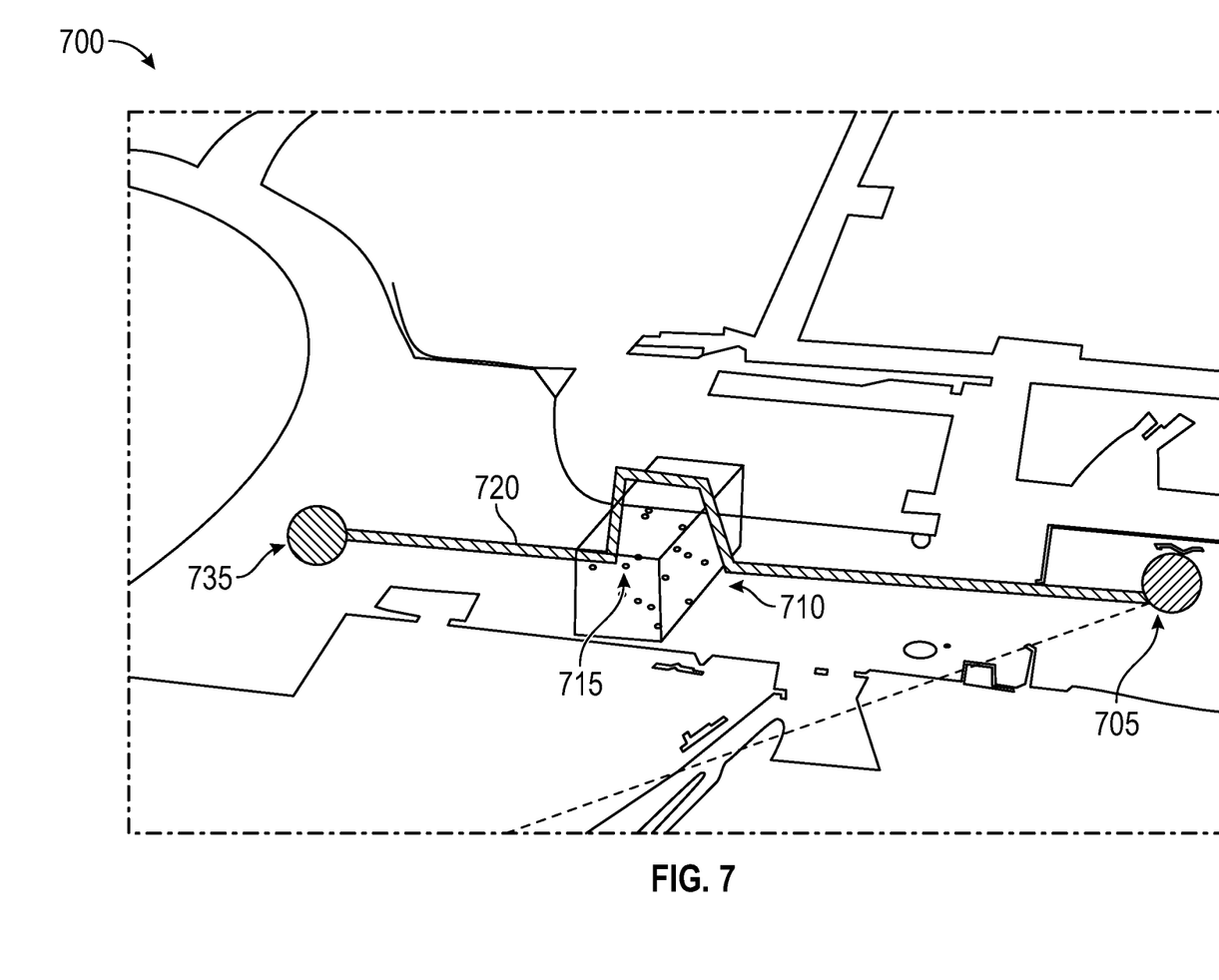
FIG. 7 illustrates an example 3D travel route that is generated on the basis of evaluating a 3D OG map in accordance with an embodiment of the disclosure.

FIG. 7 illustrates an example travel route 720 that can be generated on the basis of evaluating a 3D OG map 700 in accordance with an embodiment of the disclosure. The travel area in this example is the same as described above with reference to FIG. 4 and the 3D OG map 700 provides height information about various objects in the travel area. The robot controller 120 may evaluate the 3D OG map 700 to identify any objects 715 that may be present between an origination spot 705 and a destination spot 735. The robot controller 120 may evaluate the objects on the 3D OG map 700 and determine a height characteristic (z coordinate of 3D coordinates x, y, and z) of an object that may constitute an obstacle in a travel route of the multifunctional robot 100. The robot controller 120 may then determine a cost factor for executing various travel routes.

For example, in a first case, the robot controller 120 may determine a first cost associated with the multifunctional robot 100 traversing a first travel route that involves the multifunctional robot 100 taking to the air at a spot 710 and flying over an object that constitutes an obstacle among the objects 715.

The robot controller 120 may then determine a second cost associated with the multifunctional robot 100 climbing over the object and compare the second cost to the first cost. If the first cost is lower than the second cost, the robot controller 120 may execute a 3D travel route plan where the multifunctional robot flies over the object. The 3D travel route plan is defined using 3D location coordinates (x, y, z coordinates) and the path follower in the robot controller 120 may direct the multifunctional robot 100 along the travel route 720.

Figure 8:
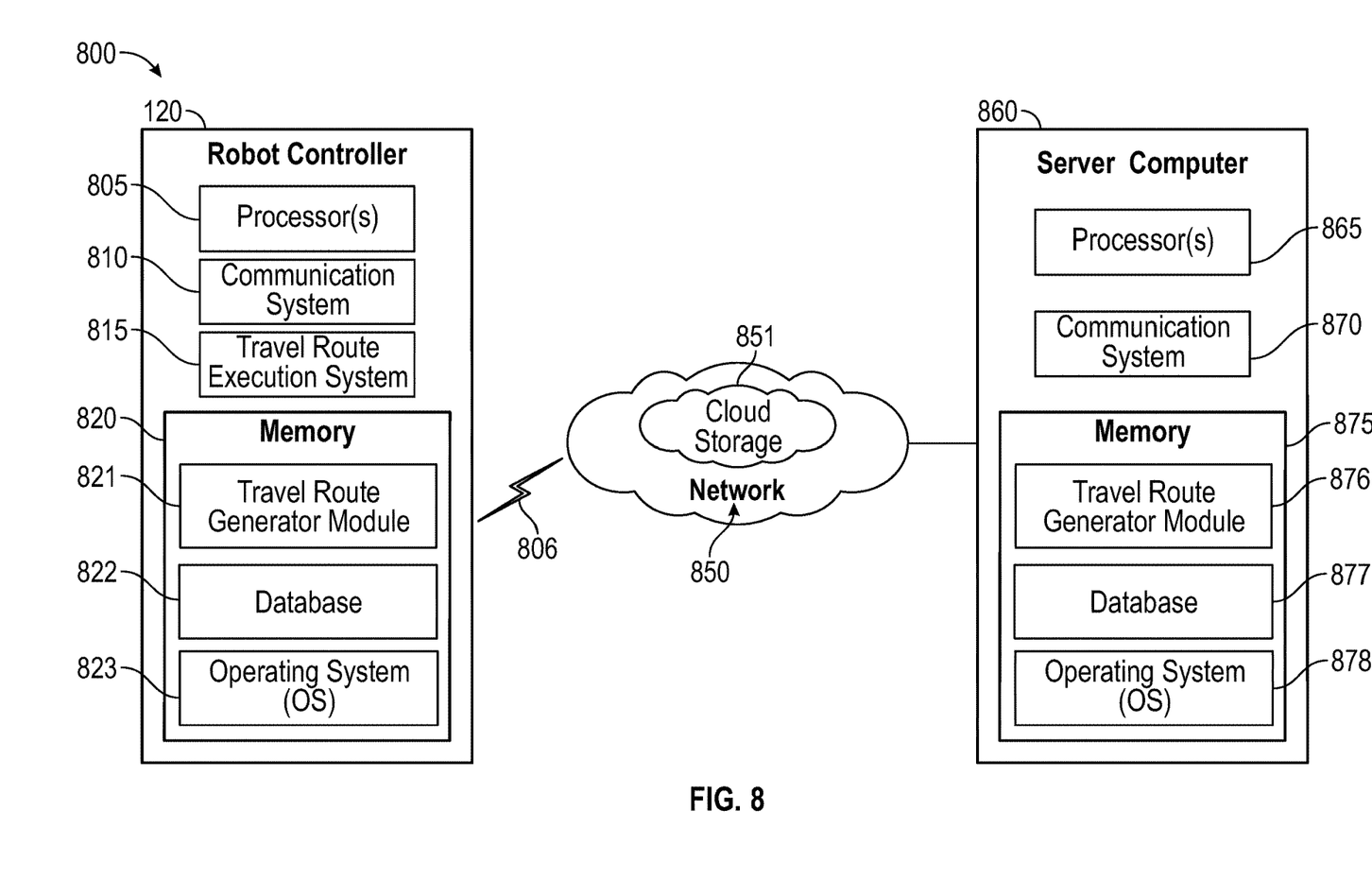
FIG. 8 shows an example system that may be used to generate a travel route in accordance with the disclosure.

FIG. 8 shows an example system 800 that may be used to generate a travel route in accordance with the disclosure. The system 800 may include the robot controller 120 that is a part of the multifunctional robot 100 and may also include a server computer 860 in some applications. The robot controller 120 may be communicatively coupled to a network 850 via a wireless communication link 806. The wireless communication link 806 may use any of various technologies and communication protocols, such as, for example, a cellular communication link or a Wi-Fi link.

The network 850 may include any one, or a combination of networks, such as a local area network (LAN), a wide area network (WAN), a telephone network, a cellular network, a cable network, a wireless network, and/or private/public networks, such as the Internet. For example, the network 850 may support communication technologies, such as Bluetooth®, cellular, near-field communication (NFC), Wi-Fi, Wi-Fi direct, machine-to-machine communication, and/or man-to-machine communication.

The robot controller 120 may include a processor 805, a communication system 810, a travel route execution system 815, and a memory 820. The communication system 810 can include hardware for communicatively coupling the robot controller 120 to the network 850 for carrying out communications and data transfers with the server computer 860 and storage elements of cloud storage 851.

The travel route execution system 815 may include a path follower system that enables the robot controller 120 to cooperate with various propulsion components of the multifunctional robot 100 (such as the set of wheels 110 and the set of propellers 105) in order to execute travel routes generated by one or more software programs stored in the memory 820 (or generated by the server computer 860 and provided to the robot controller 120).

The memory 820, which is one example of a non-transitory computer-readable medium, may be used to store an operating system (OS) 823, a database 822, and various code modules, such as a travel route generator module 821. The code modules are provided in the form of computer-executable instructions that can be executed by the processor 805 for performing various operations in accordance with the disclosure. More particularly, travel route generator module 821 may be executed by the processor 805 in order to perform various operations, such as evaluating various types of maps (such as the various OG maps described above), planning one or more travel routes, determining costs associated with the travel routes, selecting one of the travel routes, and cooperating with the travel route execution system 815, to execute a travel route plan for the selected travel route.

The database 822 may be configured to store various types of data, such as, for example, various OG maps that may be used by the robot controller 120 to determine travel routes. The various maps may also be stored in cloud storage 851 and fetched by the robot controller 120 (by use of the communication system 810) for determining travel routes in various embodiments in accordance with the disclosure.

The server computer 860 may include a processor 865, a communication system 870, and a memory 875. The communication system 870 can include hardware for communicatively coupling the server computer 860 to the network 850 for carrying out communications and data transfers with the robot controller 120.

The memory 875, which is another example of a non-transitory computer-readable medium, may be used to store an operating system (OS) 878, a database 877, and various code modules, such as a travel route generator module 876. The code modules are provided in the form of computer-executable instructions that can be executed by the processor 805 for performing various operations in accordance with the disclosure. More particularly, travel route generator module 876 may be executed by the processor 865 in order to perform various operations, such as evaluating various types of maps (such as the various OG maps described above), determining costs associated with various travel routes, selecting a travel route, and transferring information pertaining to a travel route plan to the robot controller 120.

The database 877 may be configured to store various types of data, such as, for example, various OG maps that may be used by the robot controller 120 as well as other robot controllers to determine travel routes. The various maps may be provided to the robot controller 120 upon the server computer 860 receiving a request for a map. The request may be transmitted by the communication system 810 of the robot controller 120 to the communication system 870 of the server computer 860.

In an exemplary implementation, the processor 865 may execute the travel route generator module 876 for generating a travel route plan and transmit the travel route plan to the robot controller 120. The processor 805 in the robot controller 120 may receive the travel route plan via the communication system 810 and provide instructions to the travel route execution system 815 for moving the multifunctional robot 100 along a travel route in accordance with the travel route plan provided by the server computer 860.

Figure 9:
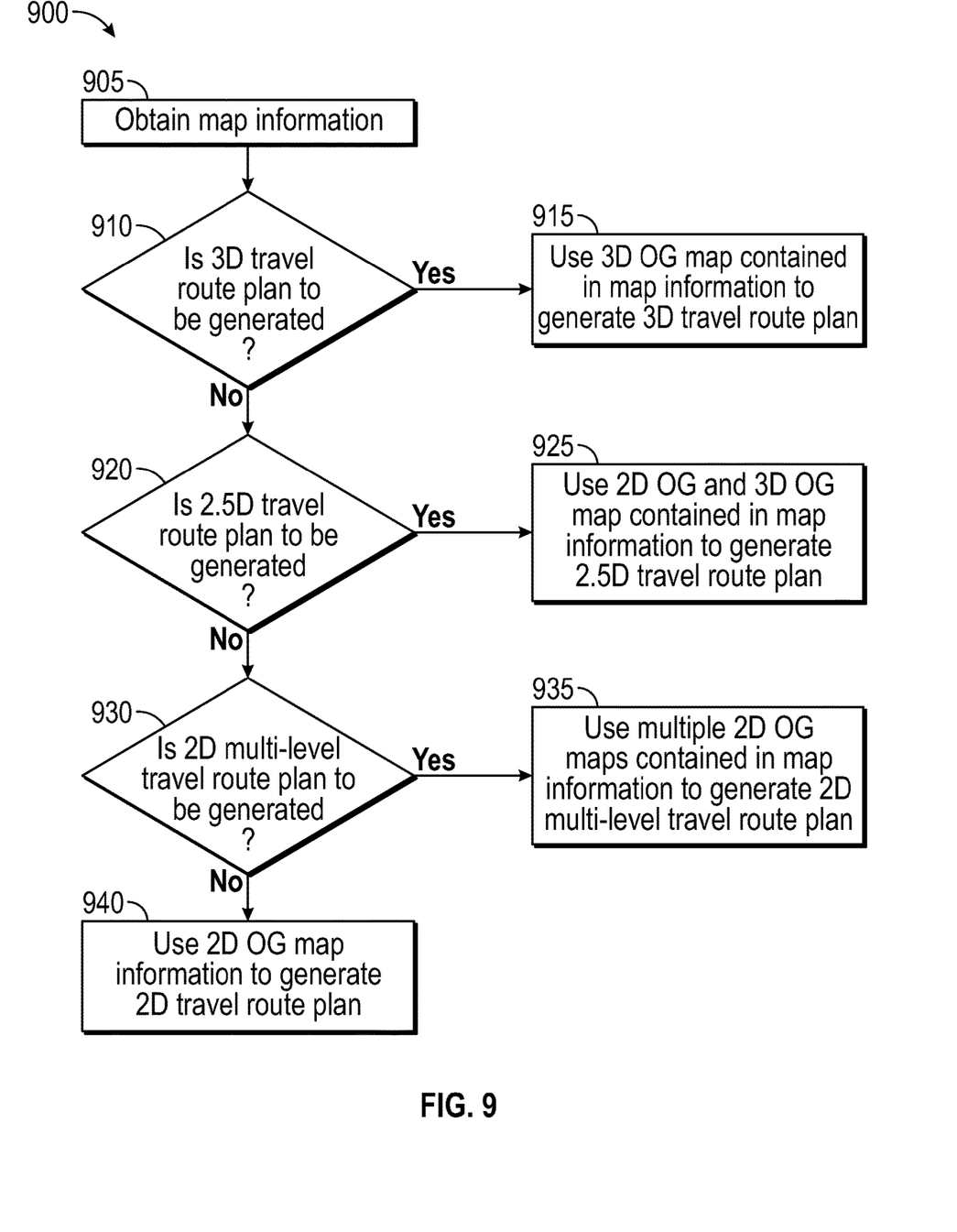
FIG. 9 is an example flowchart of a method to generate various types of travel route plans in accordance with the disclosure.

FIG. 9 is an example flowchart 900 of a method to generate a travel route in various environments, in accordance with the disclosure. The flowchart 900 illustrates a sequence of operations that can be implemented in hardware, software, or a combination thereof. In the context of software, the operations represent computer-executable instructions stored on one or more non-transitory computer-readable media, such as the memory 820 and/or the memory 875, that, when executed by one or more processors, such as the processor 805 or the processor 865, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The robot controller 120 is used below for describing various operations. However, it must be understood that some of these operations may be performed by other devices, such as, for example, the server computer 860.

At block 905, the robot controller 120 receives map information, which in this example, is OG map information. At block 910, a determination is made by the robot controller 120 whether a 3D travel route plan is to be generated. The determination may be made based on a travel area that the multifunctional robot 100 has to traverse. If a 3D travel route plan is to be generated, at block 915, the robot controller 120 generates a 3D travel route plan (described above) that may be based on a 3D OG map contained in the map information.

At block 920, a determination is made by the robot controller 120 whether a 2.5D travel route plan is to be generated. The determination may be made based on a travel area that the multifunctional robot 100 has to traverse. The travel area may include one or more obstacles that necessitate the multifunctional robot 100 taking to the air. If a 2.5D travel route plan is to be generated, at block 925, the robot controller 120 generates a 2.5D travel route plan (described above) that may be based on a 2D OG map and a 3D OG map contained in the map information.

At block 930, a determination is made by the robot controller 120 whether a 2D multi-level travel route plan is to be generated. The determination may be made based on a travel area that includes two or more levels of a multistoried building that the multifunctional robot 100 has to traverse. If a 2D multi-level travel route plan is to be generated, at block 935, the robot controller 120 generates a 2D multi-level travel route plan (described above) that may be based on multiple 2D OG maps contained in the map information.

If the travel area is present in a single level (a front lawn of a building, for example), at block 940, the robot controller 120 generates a 2D travel route plan (described above) that may be based on a 2D OG map contained in the map information.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the robot controller 120 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a controller, a map that includes information about a three-dimensional (3D) object present in a travel area of a multifunctional robot;
   determining, by the controller, a first cost associated with traversing a first travel route from an origination spot to a destination spot in the travel area, wherein traversing the first travel route comprises the multifunctional robot driving around the 3D object;
   determining, by the controller, a second cost associated with traversing a second travel route from the origination spot to the destination spot in the travel area, wherein traversing the second travel route comprises the multifunctional robot flying over the 3D object; and
   selecting, by the controller, one of the first travel route or the second travel route based on comparing the first cost to the second cost,
   wherein the controller is provided in the multifunctional robot and wherein the map is an occupancy grid map stored in one of a database provided in the multifunctional robot or stored in cloud storage.

2. The method of claim 1, wherein the first cost and/or the second cost is based on a travel distance, a travel time, and/or a height of the 3D object.

3. The method of claim 1, further comprising:
   determining, by the controller, based on information contained in the map whether the multifunctional robot can climb over the 3D object;
   determining, by the controller, a third cost associated with traversing a third travel route from the origination spot to the destination spot in the travel area, wherein traversing the third travel route comprises the multifunctional robot climbing over the 3D object;
   selecting, by the controller, one of the first travel route, the second travel route, or the third travel route based on evaluating the first cost, the second cost, and the third cost; and
   traversing, by the multifunctional robot, the selected one of the first travel route, the second travel route, or the third travel route.

4. The method of claim 1, further comprising:
   capturing an image of the 3D object;
   determining, by the controller, based on evaluating the image whether the multifunctional robot can climb over the 3D object;
   determining, by the controller, a third cost associated with traversing a third travel route from the origination spot to the destination spot in the travel area, wherein traversing the third travel route comprises the multifunctional robot climbing over the 3D object;
   selecting, by the controller, one of the first travel route, the second travel route, or the third travel route based on evaluating the first cost, the second cost, and the third cost; and
   traversing, by the multifunctional robot, the selected one of the first travel route, the second travel route, or the third travel route.

5. The method of claim 1, further comprising:
   determining, by the controller, a constraint associated with flying over the 3D object; and eliminating, by the controller, the second travel route, based on the constraint.

6. The method of claim 5, wherein the constraint is based on a height of the 3D object and/or a flight restriction over the 3D object.

7. A method comprising:
receiving, by a controller, a map comprising information about a multistoried building that includes a travel area of a multifunctional robot;
identifying, by the controller, an origination spot that is located on a first level of the multistoried building, a destination spot that is located on a second level of the multistoried building, and an intermediate location on the first level that is a transition point for the multifunctional robot to move from the first level to the second level; and
determining, by the controller, a first travel route for the multifunctional robot to travel from the origination spot to the destination spot, the first travel route including the transition point where the multifunctional robot moves from the first level to the second level.

8. The method of claim 7, wherein the map includes information about a three-dimensional (3D) object that is present on one of the first level or the second level, and wherein the method further comprises:
determining, by the controller, a first cost associated with traversing the first travel route, wherein traversing the first travel route comprises the multifunctional robot driving around the 3D object;
determining, by the controller, a second cost associated with traversing a second travel route from the origination spot to the destination spot, wherein traversing the second travel route comprises the multifunctional robot flying over the 3D object; and
selecting, by the controller, one of the first travel route or the second travel route based on comparing the first cost to the second cost.

9. The method of claim 8, wherein the 3D object is one of an item of furniture, a room partition, a box, or a package.

10. The method of claim 8, further comprising:
determining, by the controller, based on information contained in the map whether the multifunctional robot can climb over the 3D object;
determining, by the controller, a third cost associated with traversing a third travel route from the origination spot to the destination spot, wherein traversing the third travel route comprises the multifunctional robot climbing over the 3D object;
selecting, by the controller, one of the first travel route, the second travel route, or the third travel route based on evaluating the first cost, the second cost, and the third cost; and
traversing, by the multifunctional robot, the selected one of the first travel route, the second travel route, or the third travel route.

11. The method of claim 10, wherein the first cost and/or the second cost is based on a travel distance, a travel time, and/or a height of the 3D object.

12. The method of claim 7, wherein the transition point is located at one of a ramp, a stairway, an escalator, or an elevator.

13. The method of claim 7, wherein the controller is provided in the multifunctional robot and wherein the map is an occupancy grid map stored in one of a database provided in the multifunctional robot or in a cloud storage element.

14. The method of claim 13, wherein the first level is one of above or below the second level in the multistoried building.

15. A controller of a multifunctional robot, the controller comprising:
a memory that stores computer-executable instructions; and
a processor configured to access the memory and execute the computer-executable instructions to at least:
receive a map that includes information about a three-dimensional (3D) object present in a travel area of the multifunctional robot;
determine a first cost associated with traversing a first travel route from an origination spot to a destination spot in the travel area, wherein traversing the first travel route comprises the multifunctional robot driving around the 3D object;
determine a second cost associated with traversing a second travel route from the origination spot to the destination spot in the travel area, wherein traversing the second travel route comprises the multifunctional robot flying over the 3D object;
select one of the first travel route or the second travel route based on comparing the first cost to the second cost;
determine, based on information contained in the map whether the multifunctional robot can climb over the 3D object;
determine, a third cost associated with traversing a third travel route from the origination spot to the destination spot in the travel area, wherein traversing the third travel route comprises the multifunctional robot climbing over the 3D object;
select, one of the first travel route, the second travel route, or the third travel route based on evaluating the first cost, the second cost, and the third cost; and
configure, one or more motors of the multifunctional robot, to move the multifunctional robot along the selected one of the first travel route, the second travel route, or the third travel route.

16. The controller of claim 15, wherein the first cost, the second cost, and/or the third cost is based on a travel distance, a travel time, and/or a height of the 3D object.

17. The controller of claim 15, wherein the processor is further configured to access the memory and execute computer-executable instructions to:
determine a constraint associated with flying over the 3D object; and
eliminate the second travel route, based on the constraint.

18. The controller of claim 17, wherein the constraint is based on a height of the 3D object and/or a flight restriction over the 3D object.

* * * * *